United States Patent
Yu et al.

(10) Patent No.: US 8,351,531 B2
(45) Date of Patent: Jan. 8, 2013

(54) APPARATUS AND METHOD FOR CANCELING INTERFERENCE IN WIRELESS COMMUNICATION SYSTEM

(75) Inventors: Tak-Ki Yu, Yongin-si (KR); Yung-Soo Kim, Seongnam-si (KR); Myeon-Kyun Cho, Seongnam-si (KR); Jae-Yeun Yun, Daejeon (KR); Yong-Hoon Lee, Daejeon (KR); Jin-Gon Joung, Seoul (KR); Won-Yong Shin, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 924 days.

(21) Appl. No.: 12/215,109

(22) Filed: Jun. 25, 2008

(65) Prior Publication Data

US 2009/0003416 A1  Jan. 1, 2009

(30) Foreign Application Priority Data

Jun. 26, 2007 (KR) .............................. 2007-0063005

(51) Int. Cl.
*H04B 7/02* (2006.01)
(52) U.S. Cl. ........................................................ 375/267
(58) Field of Classification Search .................. 375/260, 375/267, 299
See application file for complete search history.

(56) References Cited

U.S. PATENT DOCUMENTS

| 7,336,727 | B2* | 2/2008 | Mukkavilli et al. | 375/299 |
|---|---|---|---|---|
| 7,801,237 | B2* | 9/2010 | Chae et al. | 375/267 |
| 2004/0257978 | A1* | 12/2004 | Shao et al. | 370/208 |
| 2005/0201481 | A1* | 9/2005 | Calderbank et al. | 375/265 |
| 2005/0281322 | A1* | 12/2005 | Lee et al. | 375/146 |
| 2006/0039493 | A1* | 2/2006 | Mukkavilli et al. | 375/267 |
| 2006/0039497 | A1 | 2/2006 | Vu et al. | |
| 2006/0153312 | A1 | 7/2006 | Yun et al. | |
| 2007/0064826 | A1* | 3/2007 | El-Gamal et al. | 375/260 |
| 2007/0140372 | A1* | 6/2007 | El-Gamal et al. | 375/267 |
| 2007/0155336 | A1 | 7/2007 | Nam et al. | |
| 2007/0177688 | A1* | 8/2007 | Wu et al. | 375/267 |
| 2008/0198695 | A1* | 8/2008 | Abdi | 367/134 |
| 2009/0024906 | A1* | 1/2009 | Calderbank et al. | 714/782 |

FOREIGN PATENT DOCUMENTS

| KR | 1020060081352 A | 7/2006 |
|---|---|---|
| KR | 1020070052511 A | 5/2007 |
| WO | WO2006019253 | * 2/2006 |

* cited by examiner

*Primary Examiner* — Jaison Joseph

(57) ABSTRACT

An apparatus and a method for canceling interference using a space-frequency block coding in a multi-antenna system. The method includes confirming a code for coding to minimize a Pairwise Error Probability (PEP) of a transmit signal of which the PEP is maximized according to a time variation; and coding the transmit signal with the code and transmitting the coded signal via at least two antennas. Accordingly, the interference cancellation can be accomplished while lowering the complexity of the receiver without degrading the spectral efficiency.

20 Claims, 10 Drawing Sheets

APPARATUS AND METHOD FOR CANCELING INTERFERENCE IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jun. 26, 2007 and assigned Serial No. 2007-63005, the entire disclosure of which is hereby incorporated by reference.

TECHNICAL FIELD OF THE INVENTION

The present invention relates generally to an apparatus and a method for canceling interference in a wireless communication system. More particularly, the present invention relates to an apparatus and a method for canceling InterCarrier Interference (ICI) using a space-frequency block coding in a wireless communication system which operates in a frequency-selective time-varying channel.

BACKGROUND OF THE INVENTION

A wireless communication system employing a single antenna can mitigate InterCarrier Interference (ICI) using a time-domain or frequency-domain equalization, an ICI cancellation at a code rate of 1/k, or a frequency-domain Partial Response Coding (PRC).

When the wireless communication system adopts the time-domain or frequency-domain equalization for the ICI cancellation, a transmitter equalizes and transmits a transmit signal according to the ICI received from a receiver. Hence, the receiver can receive the ICI-mitigated signal from the transmitter. However, a severe channel variation raises complexity required for the equalization of the receiver.

When the wireless communication system adopts the ICI cancellation at the code rate of 1/k, the transmitter multiples one data symbol by pre-defined weight coefficients in the frequency domain, maps the data symbol to subcarriers of one group, and then transmits the signal. Thus, the receiver can receive the ICI-mitigated signal from the transmitter. While the wireless communication system can alleviate the ICI using the ICI cancellation at the code rate of 1/k, the spectral efficiency is reduced by 1/k times.

When the wireless communication system adopts the frequency-domain PRC for the ICI cancellation, the transmitter can mitigate the ICI by performing the PRC on signals input to an Inverse Fast Fourier Transform (IFFT) stage. However, as detecting the signal from the transmitter, the receiver is subject to a high complexity.

As above, when the wireless communication system conducts the ICI cancellation, the ICI can be alleviated but the equalization complexity of the receiver increases or the spectral efficiency is lowered.

Recently, advances of the wireless communication technology accelerate the use of multimedia services. In this respect, it is necessary to transmit mass data at a high data rate in radio channels. To this end, researches are conducted on wireless communication systems for transmitting mass data in a mobile channel and in the radio channel. For example, a Multiple-Input Multiple-Output (MIMO) system capable of transmitting the mass data is under development.

The MIMO system utilizes the same ICI cancellation schemes as the single-antenna wireless communication system. Specifically, for the ICI rejection, the MIMO system uses the frequency-domain or time-domain equalization, the ICI cancellation at the code rate of 1/k, or the frequency-domain PRC.

As discussed above, when the MIMO system adopts the ICI cancellation, the ICI can be mitigated. Disadvantageously, the equalization complexity of the receiver increases or the spectral efficiency decreases.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for canceling InterCarrier Interference (ICI) in a Multiple-Input Multiple-Output (MIMO) system.

Another aspect of the present invention is to provide an apparatus and a method for designing a code for ICI cancellation using a code rate t/k in a wireless communication system.

Yet another aspect of the present invention is to provide an apparatus and a method for designing a space-frequency block code of a code rate t/k based on a pairwise error probability for ICI cancellation in a wireless communication system.

The above aspects are achieved by providing a method for canceling interference using a space-frequency block coding in a transmitter of a multi-antenna system. The method includes confirming a code for coding to minimize a Pairwise Error Probability (PEP) of a transmit signal of which the PEP is maximized according to a time variation; and coding the transmit signal with the code and transmitting the coded signal via at least two antennas.

According to one aspect of the present invention, a method for canceling interference using a space-frequency block coding in a receiver of a multi-antenna system, includes confirming a code for decoding to minimize a PEP of a receive signal of which the PEP is maximized according to a time variation; and decoding a signal received via at least two antennas with the code.

According to another aspect of the present invention, an apparatus for canceling interference using a space-frequency block coding in a transmitter of a multi-antenna system includes a code generator for generating a code which codes to minimize a PEP of a transmit signal, the PEP maximized according to a time variation; a coder for coding the transmit signal with the code generated at the code generator; and a transmitter for transmitting the coded transmit signal via at least two antennas.

According to yet another aspect of the present invention, an apparatus for canceling interference using a space-frequency block coding in a receiver of a multi-antenna system includes a receiver for receiving a signal via at least two antennas; a code confirmer for confirming a code for the decoding to minimize a PEP of a receive signal of which the PEP is maximized according to a time variation; and a decoder for decoding the signal received through the receiver with the code confirmed at the code confirmer.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
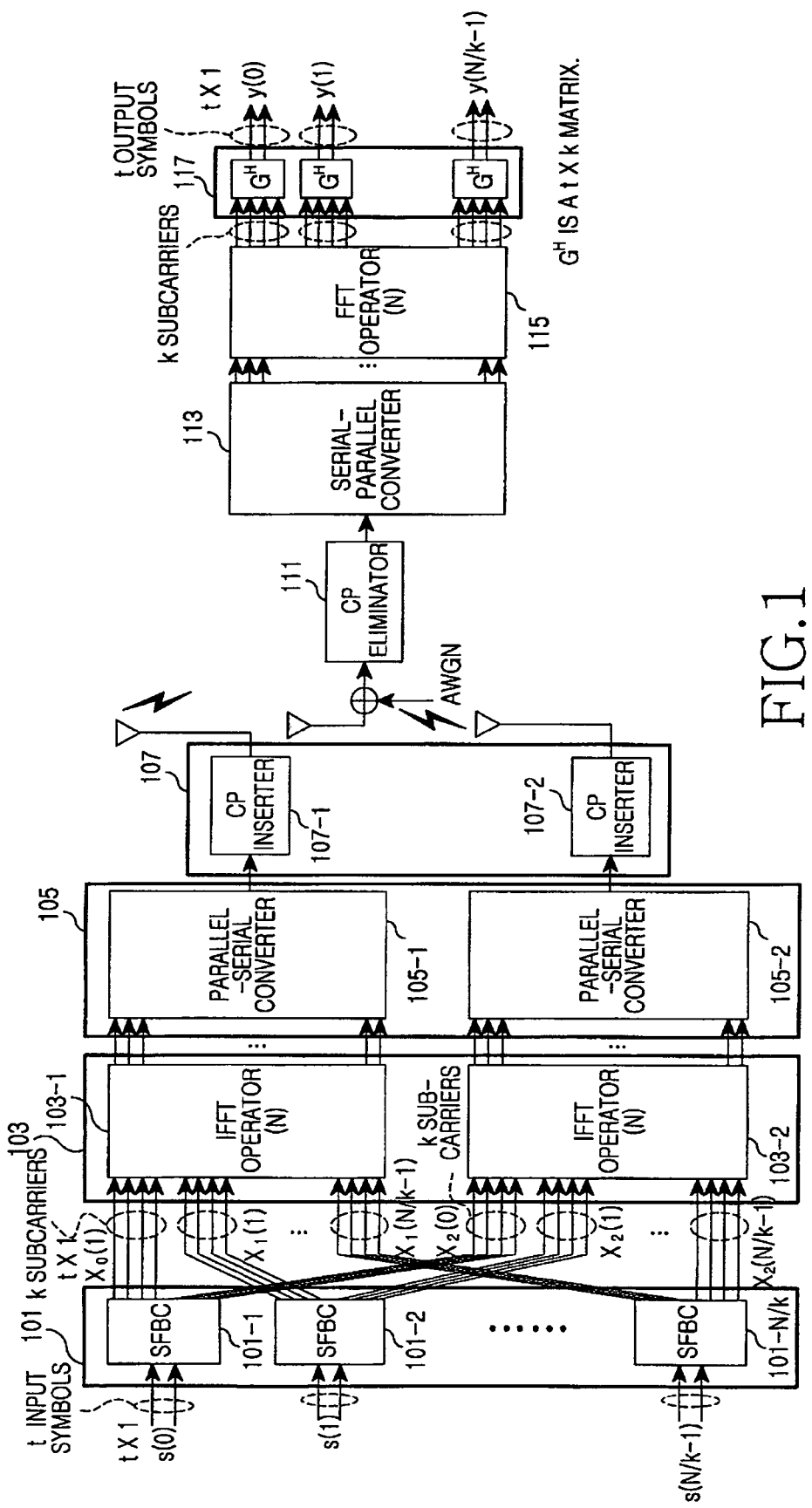
FIG. 1 is a block diagram of a transmitter and a receiver in a wireless communication system according to an exemplary embodiment of the present invention.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for canceling InterCarrier Interference (ICI) using frequency-domain codes of a code rate t/k in a wireless communication system. Herein, the frequency-domain code indicates space-frequency code.

In the following explanations, the wireless communication system designs the space-frequency codes according to the t/k code rate, a diversity gain, a coding gain, and an ICI cancellation gain. Herein, the wireless communication system can adjust the diversity gain and the coding gain of the space-frequency codes depending on t which determines the code rate of the space-frequency codes.

Hereinafter, a Multiple-Input Single-Output (MISO) system using an Orthogonal Frequency Division Multiplexing (OFDM) scheme is illustrated by way of example. Note that the present invention is applicable to any other wireless communication systems.

The MISO system rejects the ICI by designing the space-frequency codes at a t/k code rate which minimizes a Pairwise Error Probability (PEP) using the PEP. Herein, when a transmitter sends a signal s(u), the PEP indicates a probability of decoding a signal $\tilde{s}(u)$ compromised at a receiver. Using the PEP, the MISO system can design the space-frequency codes to lower a Bit Error Rate (BER) or a Frame Error Rate (FER). Even not knowing channel information of the receivers, the transmitter of the MISO system can design the space-frequency codes using the PEP.

Based on the PEP, the MISO system can design the space-frequency codes which can vary the diversity gain and the coding gain so as to have an advantage in terms of a Signal to Noise Ratio (SNR).

The PEP can be expressed as shown in Equation 1:

$$P(s(u) \to \tilde{s}(u)) = P(D(u) \to \tilde{D}(u)). \qquad \text{[Eqn. 1]}$$

In Equation 1, $P(s(u) \to \tilde{s}(u))$ denotes a probability of decoding the signal $\tilde{s}(u)$ compromised at the receiver when the transmitter sends the original signal s(u). $P(D(u) \to \tilde{D}(u))$ denotes a probability of decoding a signal $\tilde{D}(u)$ compromised at the receiver when the transmitter sends an original signal D(u) encoded for the interference cancellation.

The original signal s(u) in Equation 1 can be expressed equivalently to the original signal D(u) encoded for the interference cancellation. Herein, the equivalent expression of the original signal s(u) and the coded original signal D(u) can be proved as follows. A channel of the signal transmitted and received via the m-th antenna of the transmitter of the MISO system can be expressed as Equation 2:

$$H_m = \begin{bmatrix} H_m(0,0) & \cdots & H_m(0, N/k-1) \\ \vdots & \ddots & \vdots \\ H_m(N/k-1, 0) & \cdots & H_m(N/k-1, N/k-1) \end{bmatrix}. \qquad \text{[Eqn. 2]}$$

$H_m$ denotes a channel matrix of the signal transmitted and received via the m-th transmit antenna.

In Equation 2, diagonal elements of $H_m$ indicate signal components, and elements excluding the diagonal elements indicate interference components. The diagonal element can be expressed with a signal component and an interference component as expressed in Equation 3:

$$H_m(u,u) = \overline{H}_m(u) + \tilde{H}_m(u). \qquad \text{[Eqn. 3]}$$

In Equation 3, $H_m(u,u)$ indicates the diagonal element of the channel matrix in the signal transceived via the m-th transmit antenna, $\overline{H}_m(u)$ indicates the signal component of $H_m(u,u)$, and $\tilde{H}_m(u)$ indicates the interference component of $H_m(u,u)$.

As expressed in Equation 3, the signal component of the channel matrix is also constituted with the signal component and the interference component. Hence, the receiver can receive the signal from the transmitter as expressed in Equation 4:

$$y(u) = G^H \overline{H}_1(u)x_1(u) + G^H \overline{H}_2(u)x_2(u) + \quad \text{[Eqn. 4]}$$
$$G^H \tilde{H}_1(u)x_1(u) + G^H \tilde{H}_2(u)x_2(u) +$$
$$G^H \sum_{v \neq u} H_1(u,v)x_1(v) + G^H \sum_{v \neq u} H_2(u,v)x_2(v) + G^H w(u)$$
$$= G^H [\overline{H}_1(u) \quad \overline{H}_2(u)] \begin{bmatrix} x_1(u) \\ x_2(u) \end{bmatrix} + v_A(u)$$
$$= G^H D(u)h_A(u) + v_A(u)$$

The term y(u) denotes the receive signal, G denotes the space-frequency code for the receiver to decode the coded signal transmitted from the transmitter for the ICI cancellation, $\overline{H}_m(u)$ indicates the signal component of the diagonal element of the channel matrix in the signal transmitted on the m-th transmit antenna, and $\tilde{H}_m(u)$ indicates the interference component of the diagonal element of the channel matrix in the signal transmitted on the m-th transmit antenna. $H_m(u,v)$ indicates the interference component excluding the diagonal elements of the channel matrix in the signal transceived via the m-th transmit antenna, and $x_m(u)$ denotes the signal transmitted over the m-th transmit antenna. $x_m(u)$ indicates a signal acquired by coding the original signal $s_m(u)$ with the space-frequency code $B_m$ for the ICI cancellation. D(u) indicates a diagonal matrix including only the diagonal elements of $x_m(u)$. $x_m(v)$ indicates the interference signal in the signal ($x_m(u)$) transmitted over the m-th transmit antenna. w(u) indicates the AWGN (Addition White Gaussian Noise). $v_A(u)$ indicates the InterCarrier Interference (ICI) and $$AWGN\left( G^H \tilde{H}_1(u)x_1(u) + G^H \tilde{H}_2(u)x_2(u) + \right.$$
$$\left. G^H \sum_{v \neq u} H_1(u,v)x_1(v) + G^H \sum_{v \neq u} H_2(u,v)x_2(v) + G^H w(u) \right).$$

As above, the transmitter codes the original signal with the space-frequency code for the interference cancellation and then transmits the coded signal. Since the receiver decodes the signal received from the transmitter using the space-frequency code, the equivalent expression of the original signal s(u) and the coded original signal D(u) is allowed as expressed in Equation 1.

To design the space-frequency code using the PEP of Equation 1, the MISO system assumes as follows.

The MISO adopts a Rayleigh distribution without the spatial correlation of the channel to design the space-frequency code using the PEP. The receiver perfectly estimates the channel and detects the signal using a Maximum Likelihood (ML). The symbols transmitted from the transmitter are not correlated and each symbol has the same power $R_s(u)=1$. Noise of the symbols received at the receiver are uncorrelated and each symbol has the same power $R_w(u)=\sigma^2 I_k$. The ICI and the additive white Gaussian noise (AWGN) follow the Gaussian distribution in the MISO system.

Under the above assumptions, the MISO system can represent an upper bound of the PEP as expressed in Equation 5. Herein, Equation 5 expresses the upper bound of the PEP using a Chernoff bound:

$$P(D(u) \to \tilde{D}(u)) \leq \frac{1}{\prod_{i=1}^{\gamma(\Delta)} \left(1 + \lambda_i(\Delta) \cdot \frac{1}{4\sigma^2}\right)} \equiv P_E. \quad \text{[Eqn. 5]}$$

In Equation 5, the term $P(D(u) \to \tilde{D}(u))$ denotes a probability of decoding a signal $\tilde{D}(u)$ compromised at the receiver when the transmitter sends an original signal D(u) encoded for the interference cancellation. $\Delta$ denotes a matrix including linearly processed values of elements indicative of a difference between the signal transmitted from the transmitter and the signal incorrectly decoded at the receiver using the channel correlation and the interference correlation. The term $\gamma(\Delta)$ denotes a rank of $\Delta$, $$\frac{1}{\sigma^2}$$

denotes the SNR, $\lambda_i(\Delta)$ denotes an eigenvalue of $\Delta$ other than zero, and $P_E$ denotes the upper bound of the PEP.

The term $\Delta$ in Equation 5 can be expressed as Equation 6:

$$\Delta = \sigma^2 R_{v_A(u)}^{-1/2} G^H (D(u) - \tilde{D}(u)) R_{h_A(u)} (D(u) - \tilde{D}(u))^H G R_{v_A(u)}^{-1/2H} \quad \text{[Eqn. 6]}$$
$$= \alpha \sigma^2 R_{v_A(u)}^{-1/2} G^H \sum_{m=1}^{M} \{B_m(s(u) - \tilde{s}(u))(s(u) - \tilde{s}(u))^H B_m^H\} G R_{v_A(u)}^{-1/2H}.$$

In Equation 6, $R_{v_A}(u)$ denotes the correlation of the interference (the ICI and the AWGN), $R_{h_A}(u)$ denotes the channel correlation, and G denotes the space-frequency code used by the receiver for the interference cancellation. The value D(u) denotes the diagonal matrix of the signal coded with the space-frequency code used by the transmitter for the interference cancellation, and $B_m$ denote the space-frequency code used by the transmitter for the interference cancellation. $\tilde{D}(u)$ indicates the matrix excluding the diagonal matrix of the signal coded with the space-frequency code used by the transmitter for the interference cancellation. s(u) denotes original signal transmitted from the transmitter, and $\tilde{s}(u)$ denotes the signal incorrectly decoded at the receiver. $\sigma^2$ indicates noise power. $\alpha$ indicates variable generated using number of OFDM subcarrier(N) and channel correlation($R_T$) according to a time variation The value $\Delta$ in Equation 6 is the matrix including the linearly processed values of the elements indicative of the difference between the signal D(u) transmitted from the transmitter and the signal $\tilde{D}(u)$ incorrectly decoded at the receiver using the channel correlation and the interference correlation.

The MISO system can design the space-frequency code of the transmitter and the receiver for the interference cancellation so as to minimize the upper bound of the PEP of Equation 5, based on Equation 7:

$$\min_{\{B\}_{m=1}^{M}, G} \max_{s(u), \tilde{s}(u)} P_E s \cdot tr\left(\sum_{m=1}^{M} B_m B_m^H\right) = k. \quad \text{[Eqn. 7]}$$

In Equation 7, B denotes the space-frequency code for the interference cancellation of the transmitter, and G denotes the space-frequency code for the interference cancellation of the receiver. $P_E$ is the upper bound of the PEP and equal to the value as in Equation (5), s(u) denotes the original signal transmitted from the transmitter, š(u) denotes the signal incorrectly decoded at the receiver, and k denotes a magnitude of the matrix output by coding the original signal at the transmitter. M denotes number of the transmit antennas.

As expressed in Equation 7, the MISO system acquires s(u) and š(u) to maximize $P_E$. Next, the MISO system designs B so as to acquire the minimum $P_E$ among $P_E$ according to s(u) and š(u). The MISO system selects B which satisfies $$tr\left(\sum_{m=1}^{M} B_m B_m^H\right) = k$$

after si in Equation 7.

After the transmitter designs the space-frequency code for the interference cancellation, the MISO system designs G corresponding to B.

In the design of the space-frequency codes as above, since the MISO system designs the code which satisfies Equation 7 among the space-frequency codes, its complexity can increase.

In this respect, the MISO system can mitigate the complexity of the code design as follows.

By taking the upper bound of $P_E$ of the PEP of Equation 5, the MISO system can express Equation 8:

$$P_E \le \left(\frac{1}{4\sigma^2}\right)^{-\gamma(\Delta)} \left(\prod_{i=1}^{\gamma(\Delta)} \lambda_i(\Delta)\right)^{-1}. \quad [\text{Eqn. 8}]$$

$P_E$ denotes the upper bound of the PEP, $\gamma(\Delta)$ denotes the rank of $\Delta$, $$\frac{1}{\sigma^2}$$

denotes the SNR, and $\lambda_i(\Delta)$ denotes the eigenvalue of A other than zero.

In Equation 8, $4\sigma^2$ denotes the SNR. Thus, the diversity gain of the MISO system is determined depending on $\gamma(\Delta)$ and the coding gain is determined based on the other elements.

Accordingly, to enhance the performance, the MISO system needs to maximize $\gamma(\Delta)$. Since $\gamma(\Delta)$ is the rank of $\Delta$ expressed as Equation 6, it is necessary to maximize Equation 6. Since $R_{v_A}(u)$ of Equation 6 indicates the correlation of the interference (the ICI and the AWGN), it takes the full rank. Therefore, the MISO system can design the space-frequency code which maximizes the rank of Equation 9. That is, the MISO system can design the space-frequency code which maximizes the diversity gain based on Equation 9:

$$\text{rank}\left(\sum_{m=1}^{M} \{B_m(s(u) - \tilde{s}(u))(s(u) - \tilde{s}(u))^H B_m^H\}\right) = \min(M, t). \quad [\text{Eqn. 9}]$$

$B_m$ denotes the space-frequency code for the m-th transmit antenna, s(u) denotes the original signal transmitted from the transmitter, and š(u) denotes the signal corrupted at the receiver. M denotes the number of the transmit antennas, and t denotes the magnitude of the signal to be coded with the space-frequency code at one time. Thus, min(M,t) denotes the maximum rank of the transmitter.

The MISO system can design the space-frequency codes as shown in Table 1, Table 2, and Table 3.

TABLE 1

| (2, 1) | | (2, 2) | | (4, 2) | |
|---|---|---|---|---|---|
| −0.6308 − 0.0105i | 0.5801 + 0.0340i | 1.1009 − 0.2271i | 0.2624 + 1.3219i | 0.7612 + 0.6713i |
| 1.2651 + 0.0378i | −0.2908 − 0.0207i | −0.5501 + 0.1058i | −0.1570 − 0.1436i | 0.2680 + 0.0239i |
| | | | | 0.2822 − 0.0899i | −0.8709 − 0.2996i |
| | | | | −0.1499 − 0.2312i | 0.1540 − 0.0313i |

| (3, 2) | | | (3, 3) | | |
|---|---|---|---|---|---|
| 0.8618 − 0.0741i | −0.4404 + 0.2886i | −0.0608 − 0.3984i | −0.1648 − 0.1745i | 0.0177 − 0.8015i |
| 0.3900 − 0.4439i | −0.1129 − 0.7527i | 0.1148 + 0.4205i | 0.1123 − 0.0147i | −0.0685 + 0.5150i |
| −0.4260 + 0.4663i | 0.1135 + 0.7964i | −0.4012 − 0.5897i | 0.0543 + 0.8122i | 0.2995 + 0.6352i |

Table 1 shows the space-frequency codes for the interference cancellation using the above methods when the transmitter includes one transmit antenna and the receiver includes one antenna.

TABLE 2

| (2, 1) | | (2, 2) | | (4, 2) | |
|---|---|---|---|---|---|
| 0.1832 − 0.6179j | −0.3133 + 0.2479j | 0.2751 − 0.5288j | −0.0241 − 0.2123j | −0.0650 − 0.2189j |
| −0.0954 + 0.3068j | 0.5970 − 0.3796j | −0.0708 − 0.0093j | 0.2440 + 0.3590j | −0.2787 + 0.7998j |
| −0.7006 − 0.8341j | 0.2272 + 0.5330j | −0.3722 − 0.0666j | −0.1588 − 0.2584j | −0.0069 − 0.2136j |
| 0.3437 + 0.4203j | −0.0364 + 0.0276j | 0.7058 + 0.0259j | 0.1424 + 0.7935j | 0.3810 − 0.3780j |
| | | | 0.2236 − 0.0189j | −0.1248 − 0.2311j |
| | | | −0.7282 − 0.4445j | 0.3528 + 0.2668j |
| | | | 0.2170 + 0.0844j | −0.1715 − 0.1783j |

TABLE 2-continued

|  |  |  |  | 0.2848 + 0.3565j | 0.0882 + 0.7343j |
| --- | --- | --- | --- | --- | --- |
| (3, 2) | | | (3, 3) | | |
| 0.0059 − 0.7936j | 0.0154 − 0.2128j | 0.0357 + 0.0601j | 0.4133 − 0.0399j | 0.2247 + 0.4053j | |
| −0.1975 − 0.0644j | 0.4691 + 0.2405j | −0.0187 − 0.1297j | −0.4388 + 0.0729j | −0.0920 − 0.3035j | |
| 0.2442 + 0.2296j | −0.5679 − 0.2889j | −0.0729 + 0.4238j | 0.0270 − 0.2693j | −0.6796 − 0.2428j | |
| −0.0674 − 0.0946j | 0.4134 − 0.7443j | 0.1608 + 0.6242j | 0.1648 + 0.1290j | −0.0871 − 0.2167j | |
| 0.5050 + 0.1387j | 0.0382 − 0.0122j | −0.1446 − 0.6146j | −0.1590 − 0.2155j | 0.1331 + 0.2304j | |
| −0.6356 − 0.1565j | −0.1465 + 0.1453j | 0.1890 − 0.0434j | 0.0622 + 0.5838j | −0.2493 − 01143j | |
| (B) Receive codes G | | | | | |
| (2, 1) | (2, 2) | | (4, 2) | | |
| −0.9914 + 0.7869j | −0.4027 − 0.6678j | 0.3498 − 0.5110j | 0.0041 + 0.1761j | 0.2898 + 0.3644j | |
| 0.4992 − 0.3857j | 0.5246 − 0.0419j | −0.8424 + 0.1472j | −0.4365 − 0.6086j | −0.4148 − 1.0945j | |
|  |  |  | 0.0424 + 0.3216j | 0.3508 + 0.3498j | |
|  |  |  | 0.9184 − 0.5039j | −0.6002 + 0.1180j | |
| (3, 2) | | | (3, 3) | | |
| −0.4730 + 0.7154j | 0.4658 − 0.6641j | −0.3691 + 0.5022j | 0.1329 − 0.5982j | −0.3760 − 0.0166j | |
| −0.1875 + 0.5052j | −0.1590 + 0.5468j | 0.3357 − 0.3255j | −0.2643 + 0.5810j | 0.5274 − 0.1073j | |
| 0.3461 − 0.7657j | 0.1272 − 0.5189j | 0.3873 + 0.2208j | 0.8640 − 0.2069j | 0.1697 + 0.4023j | |

Table 2 shows the space-frequency codes for the interference cancellation using the above methods when the transmitter includes two transmit antennas and the receiver includes one antenna.

TABLE 3

| (2, 1) | (2, 2) | | (4, 2) | | |
| --- | --- | --- | --- | --- | --- |
| −0.3187 + 0.0719j | 0.4302 + 0.2411j | 0.1202 − 0.2666j | 0.0020 − 0.0821j | −0.1628 − 0.2478j | |
| 0.6411 − 0.1360j | −0.2818 + 0.1780j | 0.2007 − 0.1624j | −0.3870 + 0.2862j | 0.2376 + 0.4094j | |
| −0.2801 − 0.1047j | −0.2382 + 0.3867j | 0.3072 − 0.5618j | 0.0382 − 0.1064j | −0.1868 − 0.2304j | |
| 0.5592 + 0.2173j | 0.2687 − 0.2611j | −0.3426 + 0.4711j | 0.6232 − 0.1614j | 0.5109 + 0.5342j | |
| 0.3883 − 0.2261j | −0.1468 + 0.1715j | 0.0812 − 0.0040j | 0.0909 + 0.2858j | 0.0816 + 0.0695j | |
| −0.7849 + 0.4433j | 0.4568 + 0.1954j | 0.2893 + 0.0981j | −0.2710 − 0.6269j | −0.0392 − 0.3009j | |
|  |  |  | 0.1764 + 0.3083j | 0.0217 + 0.0374j | |
|  |  |  | −0.0733 − 0.4868j | −0.1451 + 0.3453j | |
|  |  |  | 0.0130 + 0.0195j | 0.1245 − 0.1078j | |
|  |  |  | 0.1983 − 0.2534j | −0.5333 + 0.4686j | |
|  |  |  | −0.0676 + 0.0156j | 0.1390 − 0.1440j | |
|  |  |  | −0.2106 + 0.5043j | 0.2296 − 0.4314j | |
| (3, 2) | | | (3, 3) | | |
| −0.1250 + 0.0422j | 0.3458 − 0.5650j | 0.1048 + 0.2886j | −0.1583 − 0.1519j | 0.2013 + 0.3325j | |
| 0.1445 − 0.0416j | −0.2674 + 0.4394j | 0.0891 + 0.1091j | −0.1465 + 0.2050j | −0.1074 − 0.3669j | |
| −0.3051 + 0.0304j | −0.0554 + 0.0838j | −0.2095 + 0.0636j | 0.2706 + 0.0407j | 0.1456 + 0.4577j | |
| 0.5921 + 0.2032j | 0.0422 + 0.1705j | −0.1438 − 0.1698j | 0.4433 + 0.1437j | −0.0821 − 0.2119j | |
| −0.4716 − 0.1012j | 0.0313 − 0.0551j | 0.0079 + 0.0156j | −0.3478 − 0.0503j | −0.0408 − 0.1211j | |
| 0.0373 − 0.3504j | −0.3339 − 0.5538j | 0.0022 + 0.5226j | 0.2434 + 0.2298j | −0.1321 − 0.1820j | |
| −0.2310 − 0.2034j | −0.1704 − 0.0592j | 0.2828 + 0.3649j | −0.0096 + 0.2333j | −0.1399 + 0.3749j | |
| 0.0825 + 0.2221j | 0.2084 + 0.0197j | −0.3012 − 0.3620j | −0.0939 − 0.2449j | 0.0039 − 0.2902j | |
| 0.6297 − 0.2644j | −0.4963 + 0.1042j | 0.0166 + 0.1477j | 0.4535 − 0.2683j | −0.0130 − 0.3563j | |
| (B) Receive codes G | | | | | |
| (2, 1) | (2, 2) | | (4, 2) | | |
| 0.0094 − 0.6308j | −0.4294 + 0.1929j | −0.7259 − 0.5047j | 0.4138 − 0.2379j | −0.0408 + 0.0317j | |
| −0.0356 + 1.2652j | −0.1215 + 0.5356j | 0.7858 + 0.2788j | −0.9812 + 0.5907j | 0.0347 + 0.5502j | |
|  |  |  | 0.4603 − 0.3230j | 0.0520 − 0.0704j | |
|  |  |  | −0.4905 + 0.3198j | −0.0318 − 1.2155j | |
| (3, 2) | | | (3, 3) | | |
| 0.2954 − 0.2316j | 0.4821 − 0.7859j | −0.1903 + 0.2426j | 0.1507 − 0.3662j | 0.7164 + 0.5279j | |
| −0.2983 + 0.3499j | −0.3737 + 0.5374j | −0.2029 + 0.2496j | −0.1319 − 0.1002j | −0.6741 − 0.4389j | |
| 0.3942 − 0.9166j | −0.1531 + 0.5917j | −0.2021 − 0.5722j | −0.6562 + 0.5191j | 0.1794 + 0.2787j | |

Table 3 shows the space-frequency codes for the interference cancellation using the above methods when the transmitter includes three transmit antennas and the receiver includes one antenna.

The transmitter and the receiver of the MISO system can cancel the interference using the space-frequency codes generated and stored in the phase of the system design. Alternatively, the transmitter can design the space-frequency codes based on the channel variation and transmit the designed codes to the receiver. Otherwise, the transmitter and the receiver can reject the interference by individually designing the space-frequency codes.

As above, the transmitter and the receiver of the MISO system can cancel the interference using the space-frequency codes at the code rate t/k. For doing so, the transmitter and the receiver are constructed as shown in FIG. 1.

FIG. 1 is a block diagram of the transmitter and the receiver in the wireless communication system according to an exemplary embodiment of the present invention. Herein, it is assumed that the transmitter includes two antennas and the receiver includes one antenna in the MISO system.

The transmitter of the MISO system includes a Space-Frequency Block Coder (SFBC) 101, an Inverse Fast Fourier Transform (IFFT) operator 103, a parallel-serial converter 105, a Cyclic Prefix (CP) inserter 107, and antennas. The transmitter also includes a code generator (not shown) for designing the space-frequency code. Using the code generator, the transmitter generates the space-frequency code for the interference cancellation.

Alternatively, the transmitter includes a storage (not shown) for storing a code book of the space-frequency codes. In this case, the transmitter further includes a code selector for selecting the space-frequency code from the code book to minimize the PEP.

Figure 2A:
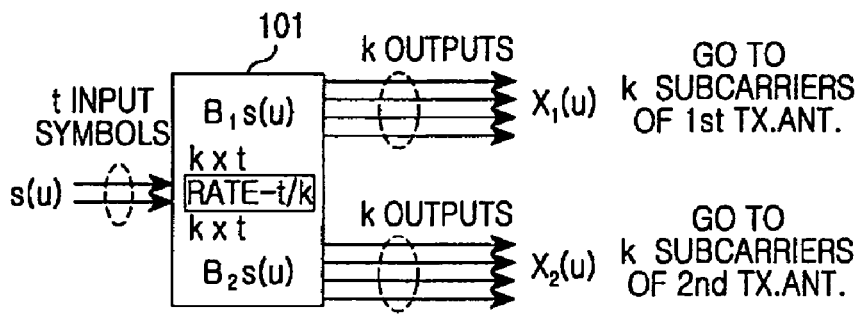
FIGS. 2A and 2B are detailed block diagrams of a space-frequency block coder in the wireless communication system according to an exemplary embodiment of the present invention.
Figure 2B:
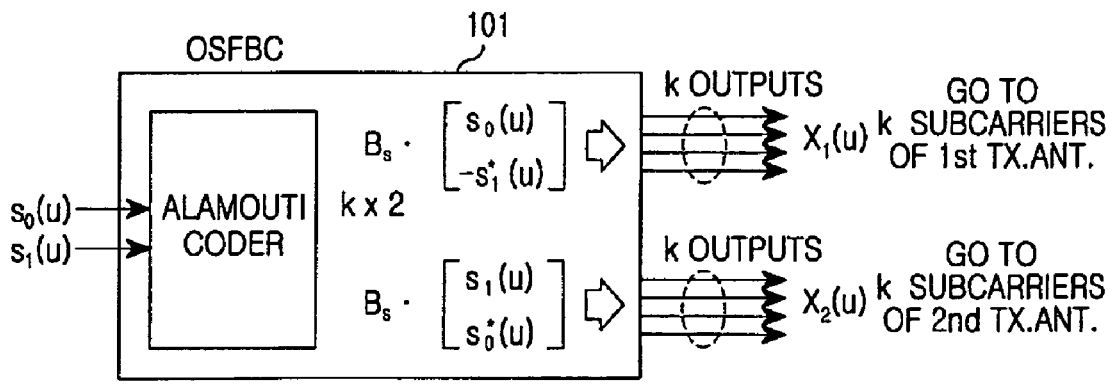

The SFBC 101 outputs k-dimensional vectors by coding the t-dimensional input vectors with the space-frequency code B. The SFBC 101 is constructed as shown in FIGS. 2A and 2B.

The IFFT operator 103 converts the frequency-domain vector output from the SFBC 101 to a time-domain vector through the IFFT operation. The IFFT operator 103 converts the frequency-domain signal to be transmitted via the antennas to a time-domain signal.

The parallel-serial converter 105 converts the parallel data output from the IFFT operator 103 to serial data.

The CP inserter 107 inserts a CP to the signal output from the parallel-serial converter 105 and outputs the signal to the receiver via the antennas.

The receiver of the MISO system includes a CP eliminator 111, a serial-parallel converter 113, an FFT operator 115, and a Space-Frequency Block Decoder (SFBD) 117. The receiver includes a code generator (not shown) for designing the space-frequency code. Using the code generator, the receiver generates the space-frequency code for the interference cancellation.

Alternatively, the receiver includes a storage (not shown) for storing a code book of the space-frequency codes. In this case, the receiver further includes a code selector for selecting the space-frequency code from the code book to minimize the PEP.

Alternatively, the receiver includes a code confirmer (not shown) for confirming the space-frequency code generated and transmitted from the transmitter.

The CP eliminator 111 eliminates the CP from the signal received on the antenna.

The serial-parallel converter 113 converts the serial signal output from the CP eliminator 111 to a parallel signal.

The FFT operator 115 converts the time-domain signal output from the serial-parallel converter 113 to a frequency-domain signal through the FFT operation. The FFT operator 115 divides the N-dimensional signal to k-dimensional vectors and outputs them to the SFBD 117.

The SFBD 117 decodes the t-dimensional vector by decoding the k-dimensional vector output from the FFT operator 115 with the space-frequency code G.

FIGS. 2A and 2B are detailed block diagrams of the SFBC in the wireless communication system according to an exemplary embodiment of the present invention.

FIG. 2A depicts an apparatus for performing the space-frequency block coding at the transmitter of the MISO system, and FIG. 2B depicts an apparatus for performing the orthogonal space-frequency block coding at the transmitter of the MISO system.

In FIG. 2A, the transmitter codes the t-dimensional vectors with the space-frequency code of the first antenna and the space-frequency code of the second antenna and outputs the k-dimensional vectors.

To code the t-dimensional vectors on the transmit antenna basis and thus output the k-dimensional vectors, the loss of the coding gain increases depending on the number of the transmit antennas.

Thus, the MISO system may perform the orthogonal space-frequency block coding at the transmitter as shown in FIG. 2B.

For the orthogonal space-frequency block coding, the SFBC 101 codes $s_i(u)$ and $s_{i+1}(u)$ with the Alamouti code for the orthogonality of the symbols. Next, the SFBC 101 outputs the k-dimensional vectors by coding the Alamouti-coded symbols in a pre-designed space-frequency block. Herein, while the SFBC 101 employs the Alamouti code by way of example, it may use other codes which sustain the orthogonality of $s_i(u)$ and $s_{i+1}(u)$.

The MISO system designs the space-frequency code of FIG. 2A and the space-frequency code of FIG. 2B. When designing the space-frequency code in FIG. 2B, the MISO system designs the space-frequency code of the transmitter to acquire the maximum diversity gain. Next, the MISO system designs to optimize the space-frequency code of the receiver by taking into account the space-frequency code of the transmitter.

Hence, the MISO system designs the space-frequency codes by simplifying Δ for calculating the upper bound of the PEP based on Equation 10:

$$\Delta = \alpha \|s(u) - \tilde{s}(u)\|^2 \cdot \sigma^2 R_{v_A(u)}^{-1/2} G^H B_s B_s^H G R_{v_A(u)}^{-1/2H}. \quad \text{[Eqn. 10]}$$

In Equation 10, $R_{v_A}(u)$ denotes the correlation of the interference (the ICI and the AWGN), $R_{h_A}(u)$ denotes the channel correlation, G denotes the space-frequency code used at the receiver for the interference cancellation, and $B_s$ denotes the space-frequency code used at the transmitter for the interference cancellation.

The MISO system can design the space-frequency codes based on Equation 10 as shown in Table 4.

TABLE 4

| (2, 2) | | (3, 2) | |
|---|---|---|---|
| −0.1666 + 0.3380j | 0.1671 − 0.5746j | 0.5724 − 0.0260j | 0.1249 − 0.5766j |
| 0.5828 − 0.0861j | 0.2170 + 0.3252j | −0.4037 − 0.1111j | 0.2028 − 0.3435j |
| | | 0.3829 + 0.1401j | −0.2696 + 0.5003j |

| (4, 2) | |
|---|---|
| 0.1852 − 0.2822j | 0.0595 − 0.1496j |
| −0.2935 + 0.6554j | −0.4264 + 0.3673j |
| 0.2379 − 0.1791j | −0.1750 − 0.0849j |
| −0.5063 + 0.1007j | 0.7962 + 0.0262j |

Table 4 shows the orthogonal space-frequency codes for the interference cancellation using the above-mentioned methods when the transmitter includes two transmit antennas and the receiver includes one antenna.

Now, descriptions provide the operations of the transmitter and the receiver for the interference cancellation using the space-frequency codes at the code rate t/k as above. It is assumed that the transmitter is a base station and the receiver is a terminal.

Figure 3:
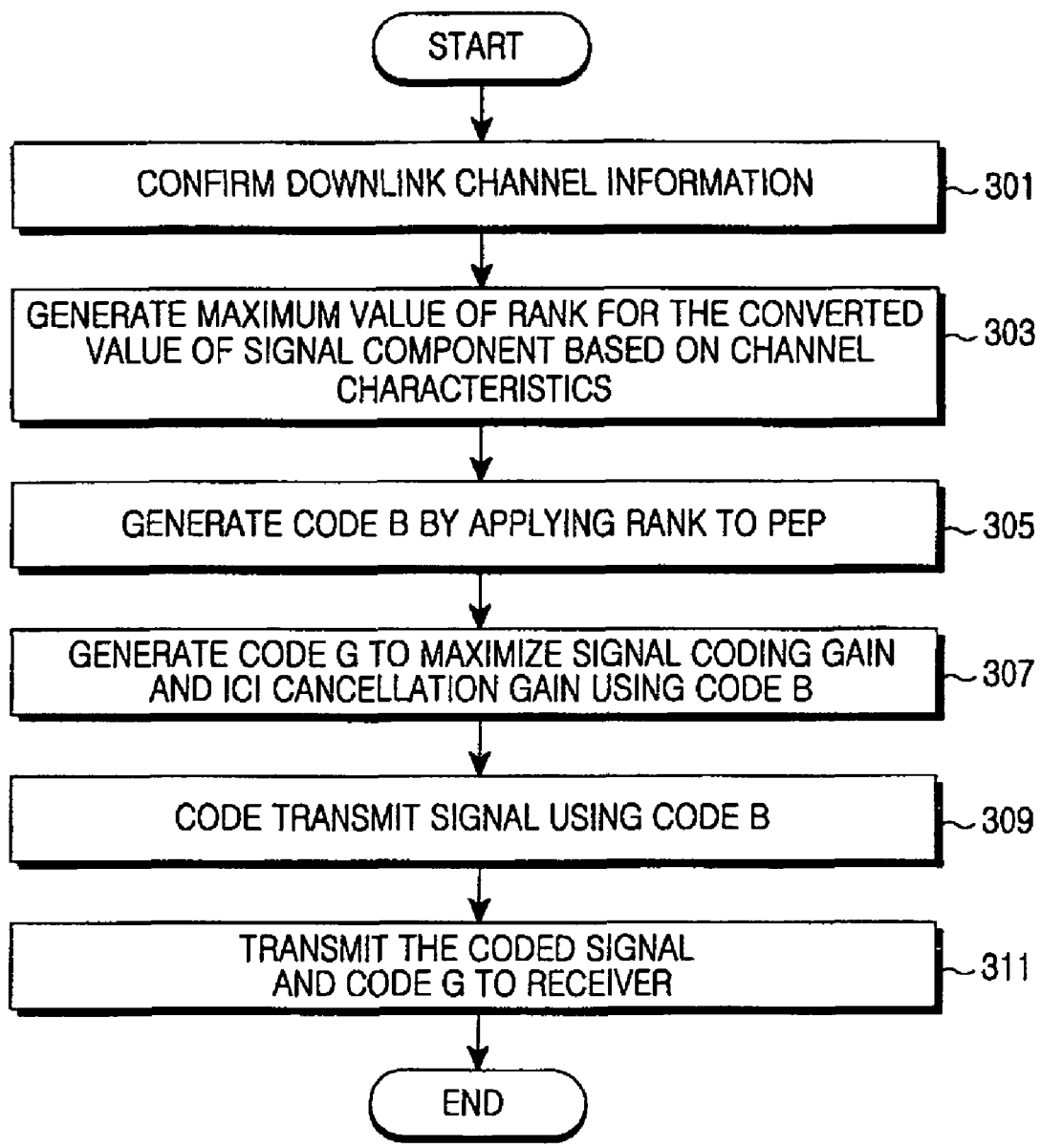
FIG. 3 is a flowchart of an interference cancellation method using a space-frequency code at a base station in the wireless communication system according to an exemplary embodiment of the present invention.

FIG. 3 is a flowchart illustrating an interference cancellation method using the space-frequency code at the base station in the wireless communication system according to an exemplary embodiment of the present invention. It is assumed that the base station designs all the space-frequency codes of the transmitter and the receiver based on Equation 9 and transmits the designed space-frequency code to the receiver.

In step 301, the base station checks downlink channel information of the terminal to be serviced. For example, the base station confirms the downlink channel information from feedback information received from the terminal. Alternatively, the base station may confirm the downlink channel information by estimating an uplink channel received from the terminal.

In step 303, the base station generates a maximum value of the rank with respect to the converted value Δ of the signal component according to the channel characteristics between the antennas and the terminal. Herein, the maximum value of the rank is determined using the number of the transmit antennas of the base station and the magnitude of the signal convertible through the space-frequency coding at a time as expressed in Equation 9.

In step 305, the base station designs the space-frequency code B of the transmitter to maximize the diversity gain of the MISO system and to meet the maximum rank. That is, the base station designs the space-frequency code B to satisfy Equation 9. In doing so, the space-frequency code of the transmitter codes the t-dimensional vectors to the k-dimensional vectors.

In step 307, the base station designs the space-frequency code G of the receiver using the space-frequency code of the transmitter to maximize the coding rate of the signal and the interference cancellation gain. The receiver decodes the k-dimensional vectors to the t-dimensional vectors using the space-frequency code G of the receiver.

In step 309, the base station codes the transmit signal using the space-frequency code of the transmitter. In more detail, the base station codes the t-dimensional vectors to the k-dimensional vectors using the space-frequency code of the transmitter to reject the interference in the transmit signal.

In step 311, the base station transmits the coded transmit signal to the terminal via the antennas. In doing so, the base station transmits the space-frequency coding information of the receiver to the terminal.

Next, the base station finishes this process.

Figure 4:
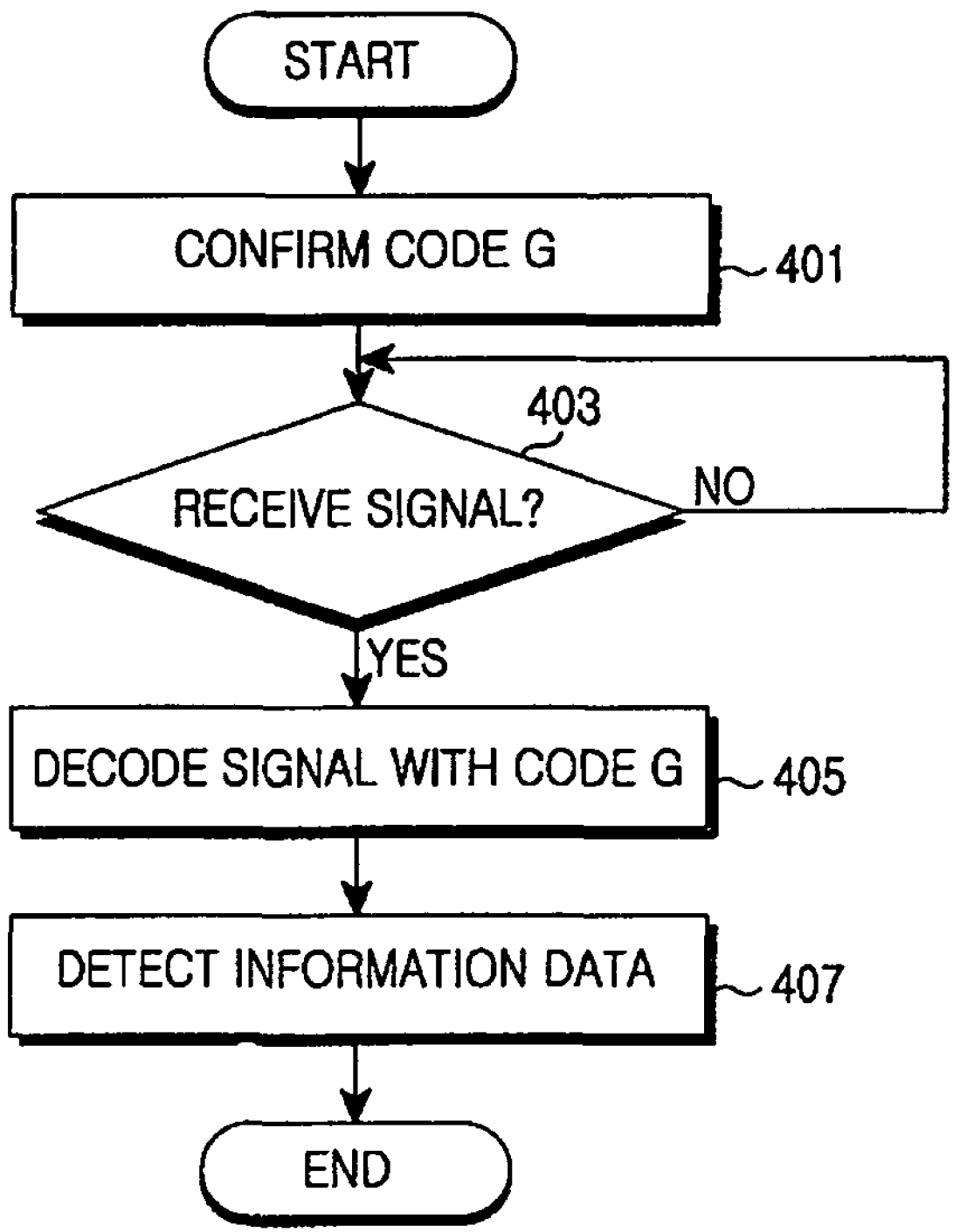
FIG. 4 is a flowchart of an interference cancellation method using the space-frequency code at a terminal in the wireless communication system according to an exemplary embodiment of the present invention.

FIG. 4 is a flowchart illustrating an interference cancellation method using the space-frequency code at the terminal in the wireless communication system according to an exemplary embodiment of the present invention.

In step 401, the terminal confirms the space-frequency code of the receiver designed at the base station. Herein, while the base station provides the space-frequency code, the terminal can design the space-frequency code by itself or get the space-frequency code in advance in the system design.

In step 403, the terminal checks whether a signal is received from the base station.

When receiving the signal, the terminal decodes the received signal using the space-frequency code of the receiver in step 405. Using the space-frequency code of the receiver, the terminal decodes the k-dimensional vectors to the t-dimensional vectors.

In step 407, the terminal detects information data from the decoded signal.

Next, the terminal finishes this process.

The following explanation describes the performance variation when the interference is rejected through the coding using the space-frequency codes of the code rate t/k designed using the PEP in the MISO system.

Figure 5:
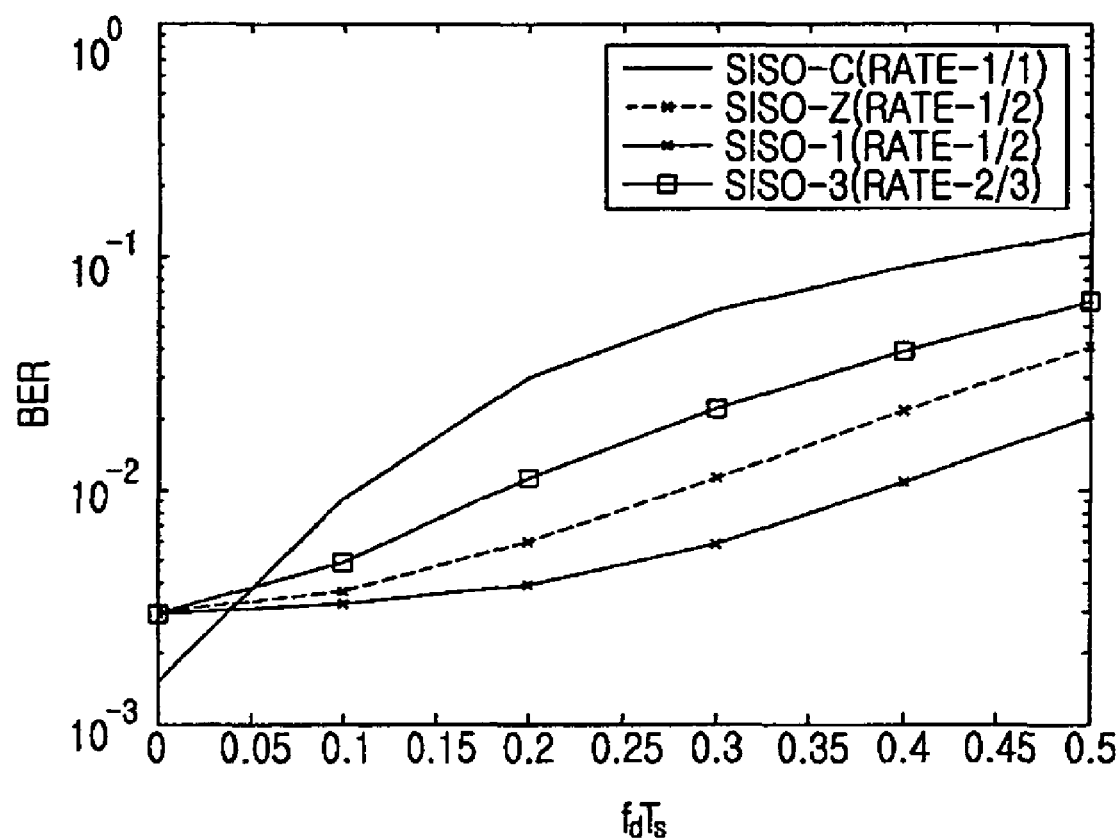
FIG. 5 is a graph showing a performance change of a single-antenna wireless communication system according to an exemplary embodiment of the present invention.
Figure 6:
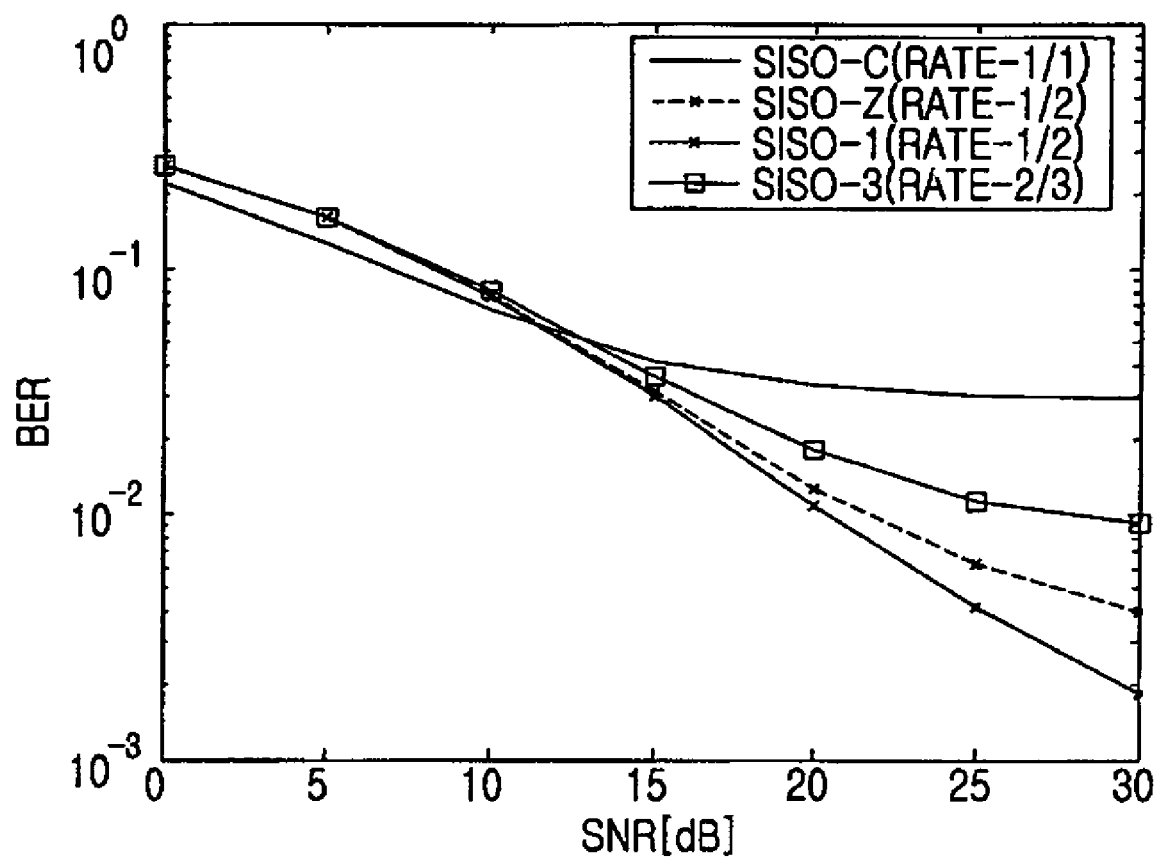
FIG. 6 is a graph showing a performance change of a single-antenna wireless communication system according to another exemplary embodiment of the present invention.

First, when the wireless communication system including a single transmit antenna cancels the interference using the space-frequency codes designed based on the PEP, the performance changes as shown in FIGS. 5 and 6.

FIG. 5 is a graph showing the performance change of a single-antenna wireless communication system according to an exemplary embodiment of the present invention. Herein, the horizontal axis indicates the normalized Doppler frequency $f_d T_s$ and the vertical axis indicates the BER.

FIG. 5 compares the change of the BER based on the Doppler frequency variation when the interference is cancelled through conventional codings SISO-C and SISO-Z and the present coding using the codes designed based on the PEP in the wireless communication system including the single transmit antenna.

At the SNR of 25 dB, the lowest BER is exhibited in the coding SISO-1 (rate 1/2) designed to have the code rate 1/2 based on the PEP according to the present invention in the period $f_d T_s > 0.04$ of the severe channel change. That is, the interference can be rejected most effectively when the wireless communication system adopts the coding SISO-1 (rate 1/2) at the code rate 1/2 based on the PEP.

FIG. 6 is a graph showing a performance change of a single-antenna wireless communication system according to another exemplary embodiment of the present invention. Herein, the horizontal axis indicates the SNR and the vertical axis indicates the BER.

FIG. 6 compares the change of the BER based on the variation of the SNR when the interference is cancelled through conventional codings SISO-C and SISO-Z and the present coding using the codes designed based on the PEP in the wireless communication system including the single transmit antenna.

When the Doppler frequency is 0.2, the lowest BER is exhibited in the coding SISO-1 (rate 1/2) designed to have the code rate 1/2 based on the PEP according to the present invention in the period SNR>11.32 dB of the high SNR. That is, the interference can be rejected most effectively when the wireless communication system adopts the coding SISO-1 (rate 1/2) at the code rate 1/2 based on the PEP.

Figure 7:
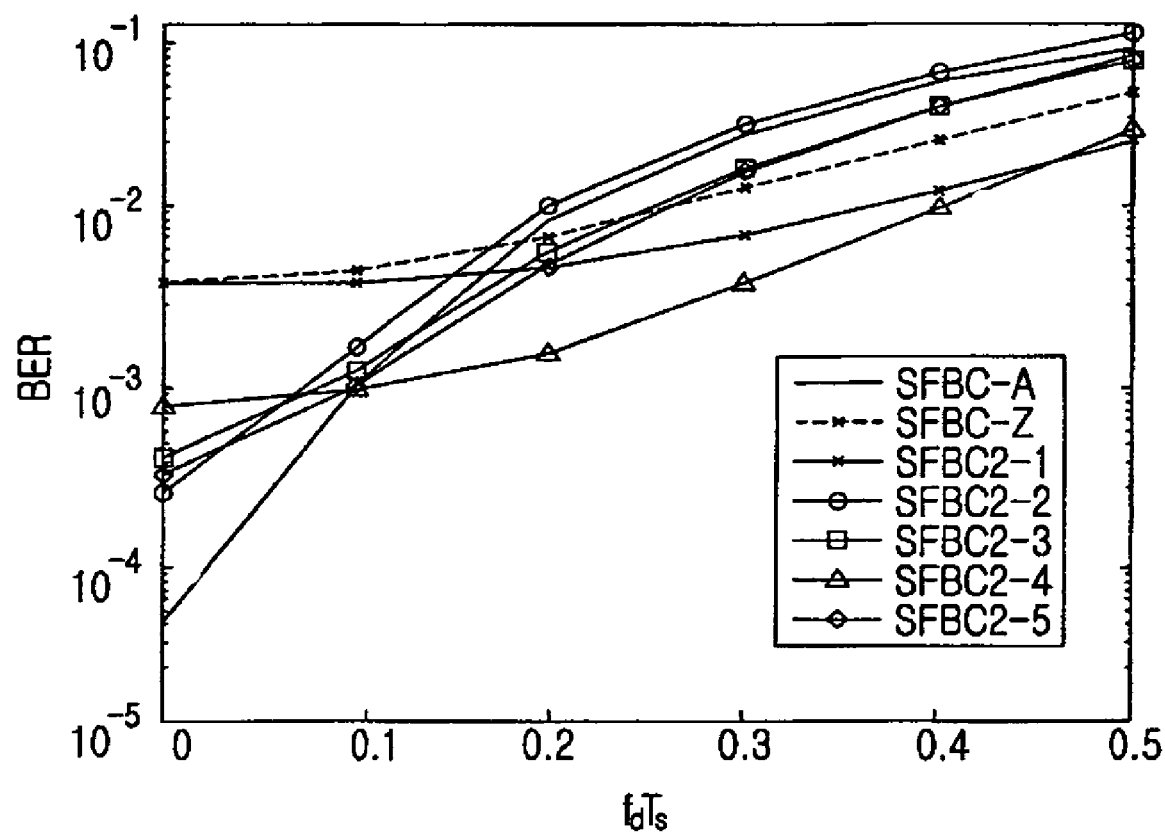
FIG. 7 is a graph showing a performance change of a multi-antenna wireless communication system according to an exemplary embodiment of the present invention.
Figure 8:
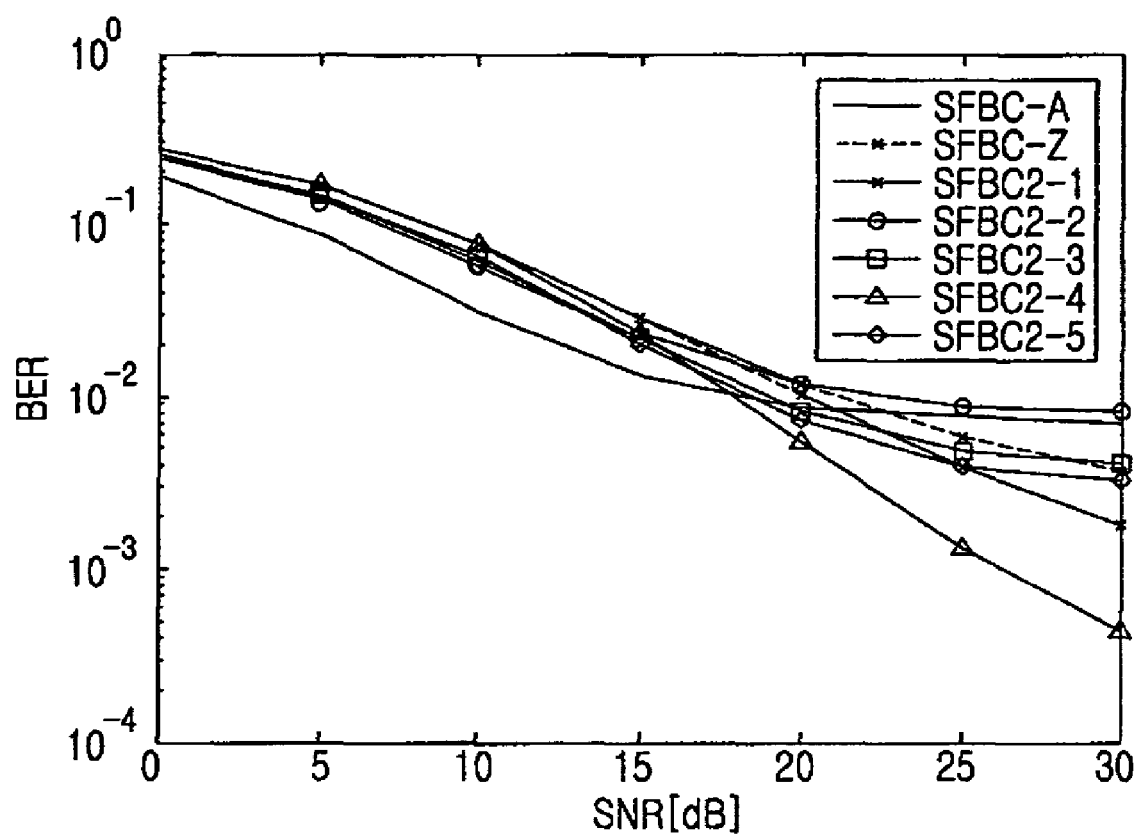
FIG. 8 is a graph showing a performance change of a multi-antenna wireless communication system according to another exemplary embodiment of the present invention.

Next, FIGS. 7 and 8 show the performance change when the wireless communication system including two transmit antennas rejects the interference through the coding using the space-frequency codes designed using the PEP.

FIG. 7 is a graph showing a performance change of a multi-antenna wireless communication system according to an exemplary embodiment of the present invention. Herein, the horizontal axis indicates the normalized Doppler frequency $f_d T_s$ and the vertical axis indicates the BER.

FIG. 7 compares the change of the BER based on the variation of the Doppler frequency when the interference is cancelled through conventional codings SISO-C and SISO-Z and the present coding using the codes designed based on the PEP in the wireless communication system including two transmit antennas.

At the SNR of 25 dB, the lowest BER is exhibited in the coding SFBC2-4 designed based on the PEP according to the present invention in the period $f_d T_s$>about 0.1 of the severe channel change. That is, the interference can be rejected most effectively when the wireless communication system adopts the SFBC2-4 coding. Herein, the SFBC2-4 represents the space-frequency code at the code rate 2/4.

FIG. 8 is a graph showing a performance change of a multi-antenna wireless communication system according to another exemplary embodiment of the present invention. The horizontal axis indicates the SNR and the vertical axis indicates the BER.

FIG. 8 compares the change of the BER based on the variation of the SNR when the interference is cancelled through conventional codings SISO-C and SISO-Z and the present coding using the codes designed based on the PEP in the wireless communication system including two transmit antennas.

When the Doppler frequency is 0.2, the lowest BER is exhibited in the SFBC2-4 coding designed based on the PEP according to the present invention in the period SNR>about 17 dB of the high SNR. That is, the interference can be rejected most effectively when the wireless communication system adopts the SFBC2-4 coding based on the PEP. The SFBC2-4 represents the space-frequency coding at the code rate 2/4.

Figure 9:
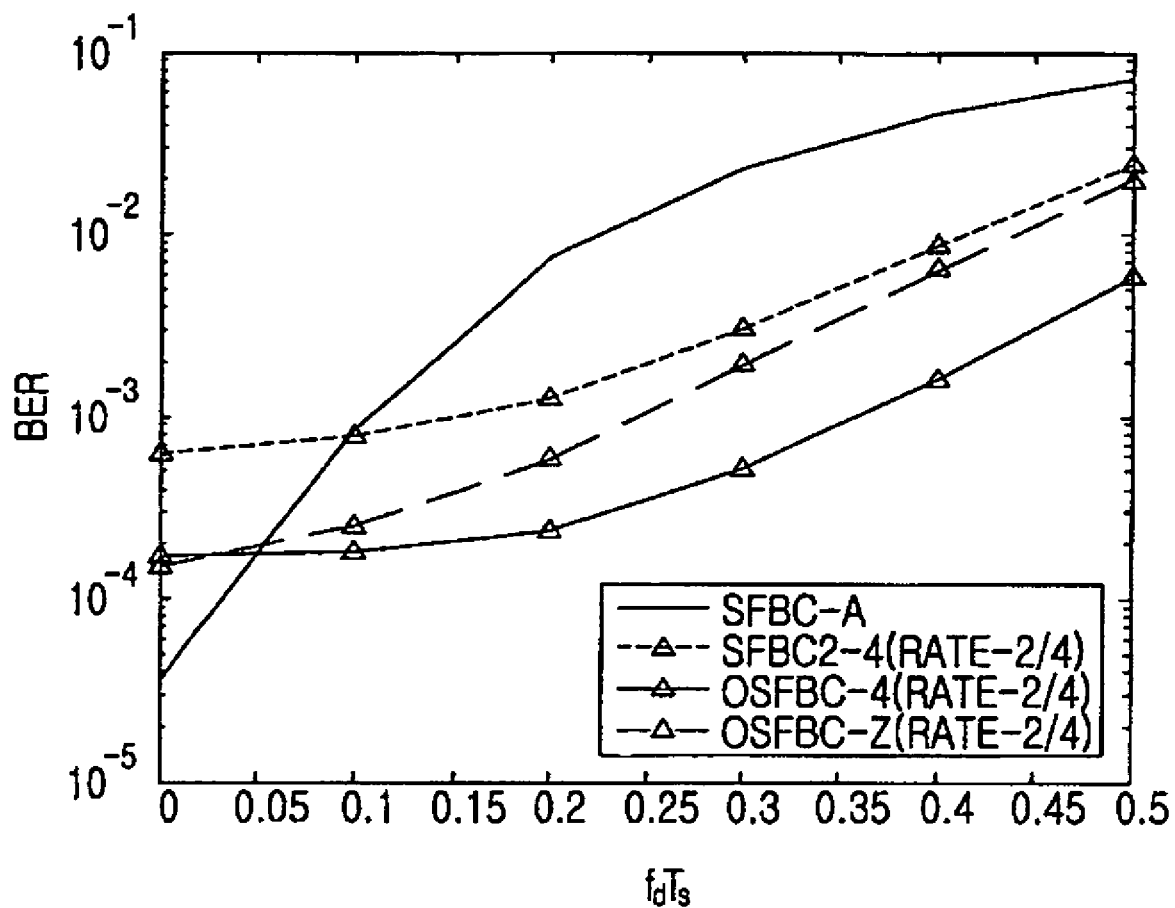
FIG. 9 is a graph showing a performance change according to the orthogonal space-frequency code in the multi-antenna wireless communication system according to an exemplary embodiment of the present invention.
Figure 10:
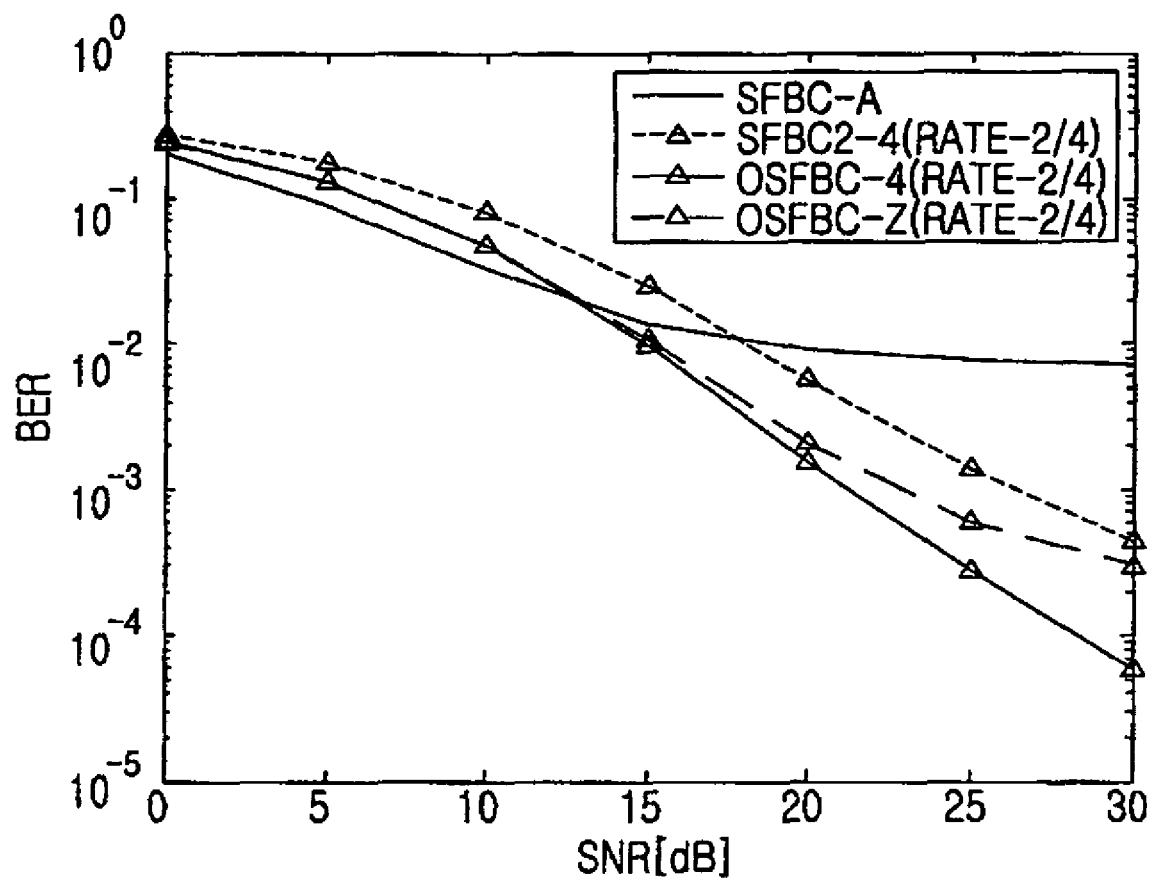
FIG. 10 is a graph showing a performance change according to the orthogonal space-frequency code in the multi-antenna wireless communication system according to another exemplary embodiment of the present invention.

When the interference is canceled through the coding using the orthogonal space-frequency codes designed based on the PEP in the wireless communication system including two transmit antennas, the performance changes as shown in FIGS. 9 and 10.

FIG. 9 depicts the performance change based on the orthogonal space-frequency coding in the multi-antenna wireless communication system according to an exemplary embodiment of the present invention. The horizontal axis indicates the normalized Doppler frequency $f_d T_s$ and the vertical axis indicates a BER.

FIG. 9 compares the change of the BER based on the variation of the Doppler frequency when the interference is cancelled through the coding using the space-frequency codes designed based on the PEP and the orthogonal space-frequency codes designed based on the PEP in the wireless communication system including the two transmit antennas.

At the SNR of 25 dB, the BER of the Orthogonal Space-Frequency Block Coding (OSFBC)-4 at the code rate 2/4 is lower than that of the SFBC2-4 at the code rate 2/4 in the period $f_d T_s$>0.05 under the severe channel change. In other words, when the wireless communication system adopts the OSFBC, the coding gain increases to thus reject the interference most effectively.

FIG. 10 is a graph showing a performance change according to the OSFBC in a multi-antenna wireless communication system according to another exemplary embodiment of the present invention. The horizontal axis indicates the SNR and the vertical axis indicates the BER.

FIG. 10 shows the change of the BER based on the variation of the SNR when the wireless communication system including two transmit antennas cancels the interference through the coding using the space-frequency code based on the PEP and the orthogonal space-frequency code based on the PEP.

When the Doppler frequency is 0.2, the BER of the OSFBC-4 at the code rate 2/4 is lower than that of the SFBC2-4 at the code rate 2/4 in the period SNR>12.6 dB of the high SNR. In other words, when the wireless communication system adopts the OSFBC, the coding gain increases to thus reject the interference most effectively.

In this exemplary embodiment of the present invention, the transmitter including the two transmit antennas transmits the signal coded with the space-frequency code designed based on the PEP. The receiver including one receive antenna cancels the interference by decoding the signal received from the transmitter with the space-frequency code designed based on the PEP.

Even when the transmitter and the receiver each include a plurality of antennas, the interference can be rejected using the space-frequency codes designed based on the PEP in the same manner. For example, when the transmitter includes four transmit antennas and the receiver includes two receive antennas in the wireless communication system, the interference can be canceled by iteratively using the space-frequency codes designed in the wireless communication system including the transmitter having two transmit antennas and the receiver having one receive antenna.

So far, when the transmitter of the wireless communication system generates the space-frequency codes, the space-frequency codes are designed in the Doppler frequency [0, 0.2] on the assumption that the transmitter does not know the Doppler frequency information.

Yet, when the transmitter can acquire additional feedback information indicative of the Doppler frequency, the transmitter can enhance the performance by designing the code book of the space-frequency code matrix according to the Doppler frequency. In other words, when not knowing the Doppler frequency information, the transmitter can mitigate the interference by selecting the space-frequency code which minimizes the upper bound of the PEP from one code book regardless of the Doppler frequency or velocity of the receiver.

If the transmitter is able to acquire the Doppler frequency or velocity information of the receiver, the transmitter can generate the code book per Doppler frequency or velocity of the receiver and select the space-frequency code in consideration of the Doppler frequency or velocity of the receiver, to thus cancel the interference. For example, given 2-bit feedback information, the wireless communication system can design and use four code books based on the Doppler frequency or velocity.

As set forth above, the wireless communication system cancels the interference by designing the codes at the code rate t/k based on the PEP. Therefore, the interference cancellation can be accomplished while lowering the complexity of the receiver without degrading the spectral efficiency.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for canceling interference using a space-frequency block coding in a transmitter of a multi-antenna system, the method comprising:
    confirming a code for coding to minimize a Pairwise Error Probability (PEP) of a transmit signal;
    coding the transmit signal with the code; and
    transmitting the coded signal,
    wherein the code is generated based on the PEP, a sum of a diagonal element in the code, and a magnitude of a matrix output at a transmitter.

2. The method of claim 1, wherein the code is generated based on the following equation:

$$\min_{\{B\}_{m=1}^M, G} \max_{s(u), \tilde{s}(u)} P_E s \cdot t \; tr\left(\sum_{m=1}^M B_m B_m^H\right) = k$$

where B denotes a code for the interference cancellation at the transmitter, G denotes a code for the interference cancellation at a receiver, $P_E$ denotes an upper bound of the PEP, s(u) denotes an original signal transmitted from the transmitter, $\tilde{s}(u)$ denotes a signal incorrectly decoded at the receiver from the original signal transmitted from the transmitter, and k denotes a magnitude of the matrix output by coding the original signal at the transmitter.

3. The method of claim 2, wherein the upper bound of the PEP is calculated based on the following equation:

$$P(D(u) \to \tilde{D}(u)) \le \frac{1}{\prod_{i=1}^{\gamma(\Delta)}\left(1 + \lambda_i(\Delta) \cdot \frac{1}{4\sigma^2}\right)} \equiv P_E$$

where $\Delta$ denotes a matrix having linearly processed values of elements indicative of a difference between the signal transmitted from the transmitter and the signal incorrectly decoded at a receiver using a channel correlation and an interference correlation, $\gamma(\Delta)$ denotes a rank of $\Delta$, $$\frac{1}{\sigma^2}$$

denotes a Signal to Noise Ratio (SNR), $\lambda_i(\Delta)$ denotes an eigenvalue of $\Delta$ other than zero, and $P_E$ denotes the upper bound of the PEP.

4. The method of claim 1, wherein the code is generated based on the following equation:

$$rank\left(\sum_{m=1}^M \{B_m(s(u) - \tilde{s}(u))(s(u) - \tilde{s}(u))^H B_m^H\}\right) = \min(M, t)$$

where $B_m$ denotes a code for an m-th transmit antenna, s(u) denotes an original signal transmitted from the transmitter, $\tilde{s}(u)$ denotes a signal compromised at the receiver, M denotes the number of the transmit antennas, t denotes a magnitude of the signal to be coded with the space-frequency code at one time, and min(M,t) denotes a maximum rank of the transmitter.

5. The method of claim 1, further comprising:
    generating a code using the confirmed code to cancel interference at a receiver; and
    transmitting the generated code to the receiver.

6. The method of claim 1, wherein the code confirming comprises:
    selecting a code which minimizes the PEP, from a code book comprising one or more codes.

7. The method of claim 6, wherein the code selecting comprises:
    selecting a code book based on Doppler frequency or velocity information provided from the receiver among one or more code books; and
    selecting a code which minimizes the PEP from the selected code book.

8. The method of claim 1, wherein the transmitting comprises:
    coding the signals to maintain orthogonality of the transmit signals; and
    coding the transmit signals coded to maintain the orthogonality with the confirmed code and transmitting the coded signals via one or more antennas.

9. A method for canceling interference using a space-frequency block coding in a receiver of a multi-antenna system, the method comprising:
    confirming a code for decoding to minimize a Pairwise Error Probability (PEP) of a received signal; and
    decoding the received signal with the code,
    wherein the code is generated based on the PEP, a sum of a diagonal element in the code, and a magnitude of a matrix output at a transmitter.

10. The method of claim 9, wherein the code confirming comprises:
    confirming a code from a signal received from a transmitter, the code generated and transmitted by the transmitter for interference cancellation by taking into account a code for the coding to minimize the PEP of the transmit signal.

11. The method of claim 9, wherein the code confirming comprises:
    selecting a code for decoding to minimize a PEP of the receive signal from one or more code books.

12. An apparatus for canceling interference using a space-frequency block coding in a transmitter of a multi-antenna system, the apparatus comprising:
    a code generator configured to generate a code which codes to minimize a Pairwise Error Probability (PEP) of a transmit signal;
    a coder configured to code the transmit signal with the code generated at the code generator; and
    a transmitting unit configured to transmit the coded transmit signal, wherein the code is generated based on the PEP, a sum of a diagonal element in the code, and a magnitude of a matrix output at a transmitter.

13. The apparatus of claim 12, wherein the code generator designs the code by taking into account at least one of a diversity gain, a coding gain, an interference cancellation gain, and a code rate.

14. The apparatus of claim 12, wherein the code generator generates a code for interference cancellation of the receiver by considering the generated code.

15. The apparatus of claim 14, wherein the transmitting unit transmits the code generated at the code generator for the interference cancellation of the receiver, to the receiver.

16. The apparatus of claim 12, wherein the code generator selects a code for the coding to minimize the PEP of the transmit signal of which the PEP is maximized according to the time variation, from a code book selected based on Doppler frequency or velocity information provided from the receiver.

17. The apparatus of claim 12, wherein the coder codes the transmit signals to maintain orthogonality of the signals and re-codes the signals with the code generated at the code generator.

18. An apparatus for canceling interference using a space-frequency block coding in a receiver of a multi-antenna system, the apparatus comprising
    a receiving unit configured to receive a signal;
    a code confirmer configured to confirm a code for the decoding to minimize a Pairwise Error Probability (PEP) of a receive signal; and
    a decoder configured to decode the signal received through the receiving unit with the code confirmed at the code confirmer,
    wherein the code is generated based on the PEP, a sum of a diagonal element in the code, and a magnitude of a matrix output at a transmitter.

19. The apparatus of claim 18, wherein the code confirmer confirms the code generated and transmitted from the transmitter for the interference cancellation by considering the code for the coding to minimize the PEP of the transmit signal, from the signal received from the transmitter through the receiving unit.

20. The apparatus of claim 18, wherein the code confirmer selects a code for the decoding to minimize the PEP of the received signal, from one or more code books.

* * * * *

UNITED STATES PATENT AND TRADEMARK OFFICE
CERTIFICATE OF CORRECTION

PATENT NO. : 8,351,531 B2
APPLICATION NO. : 12/215109
DATED : January 8, 2013
INVENTOR(S) : Yu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Second Day of December, 2014

Michelle K. Lee
*Deputy Director of the United States Patent and Trademark Office*